May 24, 1960  F. H. MUELLER  2,937,539
VARIABLE SPEED TRANSMISSION FOR DRILLING MACHINE
Filed Oct. 7, 1958  2 Sheets-Sheet 2

INVENTOR
FRANK H. MUELLER

BY Cushman, Darby & Cushman
ATTORNEYS

United States Patent Office 2,937,539
Patented May 24, 1960

2,937,539

VARIABLE SPEED TRANSMISSION FOR DRILLING MACHINE

Frank H. Mueller, Decatur, Ill., assignor to Mueller Co., Decatur, Ill., a corporation of Illinois Filed Oct. 7, 1958, Ser. No. 765,867

7 Claims. (Cl. 74—372)

This invention relates to an improved variable speed transmission for a machine for drilling or tapping mains or pipes without the escape of fluid pressure therefrom, typified, for example, by the drilling machine disclosed in U.S. Patent No. 2,833,167.

Drilling machines of the type disclosed in the aforementioned patent are provided with a pressure-tight housing completely enclosing a boring bar, and usually are power driven by a suitable portable detachable motor, such as an air motor, an electric motor, or an internal combustion engine. Such machines are employed to cut circular holes of various sizes, for example, from 6″ in diameter up to 12″ in diameter. It will be seen that the boring bar must have a greater torque to cut a 12″ diameter hole than to cut a hole of smaller diameter. Consequently, the drive from the motor to the boring bar must be geared to provide the large torque necessary to cut a 12″ hole. This large torque is unnecessary, however, in making a smaller cut. Therefore, if the available power of the motor can be used to drive the boring bar at a higher speed in making smaller cuts, then the latter can be made in less time, with a consequent saving in labor expense.

Accordingly, it is an object of this invention to provide an improved variable speed transmission for a drilling machine of the type with which this invention is concerned.

It is a further object of this invention to provide a variable speed transmission with improved and simple means for changing speeds.

Other objects and advantages of the invention will become apparent from the following description and accompanying drawings in which.

Figure 1:
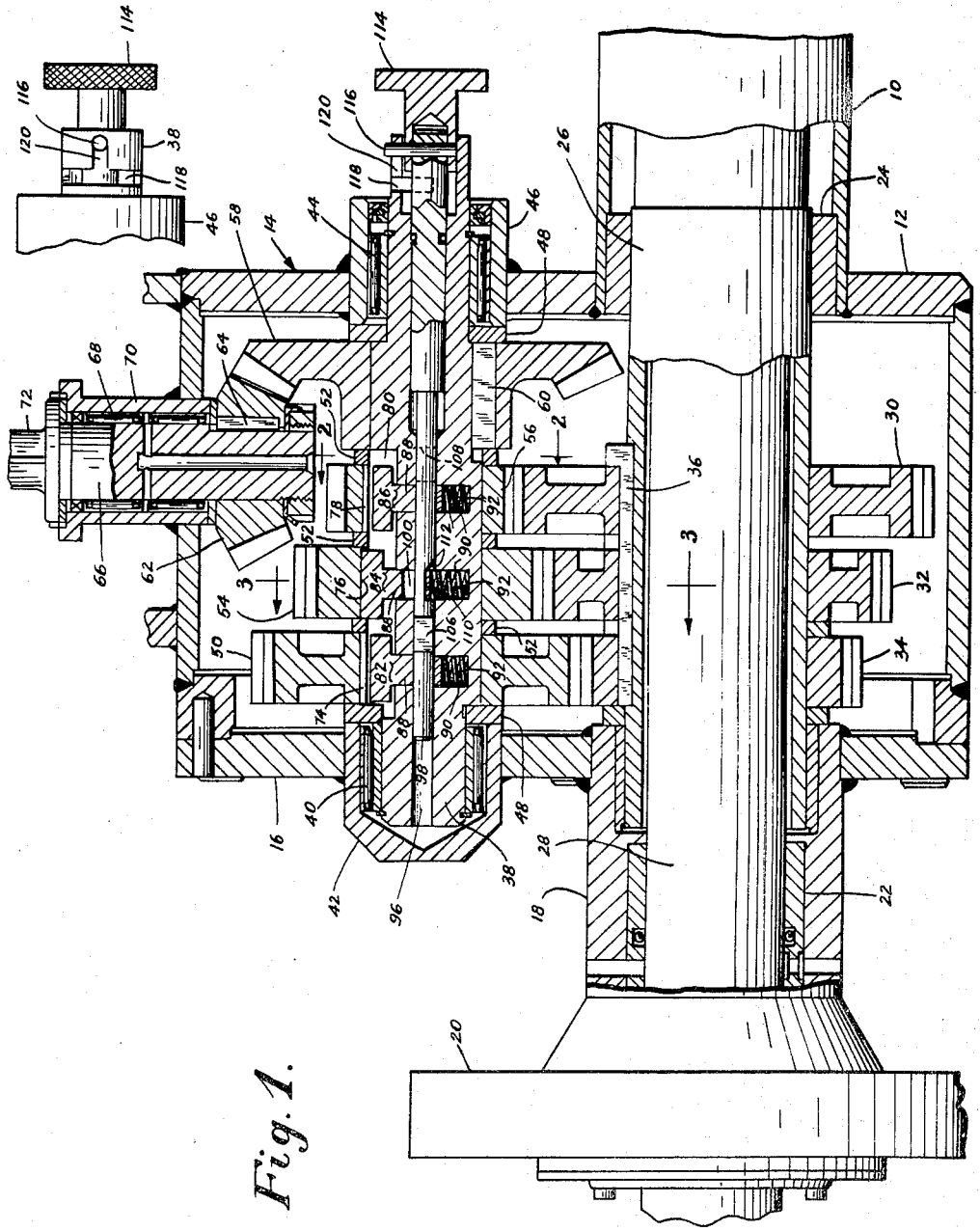
Figure 1 is a fragmentary side view, partially in longitudinal section, of a drilling machine provided with a variable speed transmission embodying this invention.

Referring now to Figure 1 of the drawings, there is shown a drilling machine having a barrel 10 provided with an end flange 12 forming an end wall of a gear housing 14. The other end wall 16 of the housing 14 is removable and provided with a tubular bearing and guiding extension 18 that is aligned with the barrel 10 and provided with a circumferential flange 20 at its extremity for bolting the machine in the usual manner to one end of a valve (not shown). Journalled in bushings 22 and 24 in the extension 18 and in the end of the barrel 10, respectively, and extending through the gear housing 14 and on into the barrel is a drive tube 26. Concentrically disposed within the drive tube 26 is a hollow boring bar 28 that projects out of the free end of the extension 18 and is provided on its exterior end with appropriate means (not shown) for detachably connecting a cutting tool (not shown). Adjacent its other end the boring bar 28 is splined by appropriate means (not shown) to the drive tube 26 for rotation thereby and for axial movement relative thereto. Suitable feeding mechanism (not shown) is disposed within the boring bar 28 and is automatically operable by the drive tube 26, or by a manual drive (not shown), for advancing or retracting the boring bar. The details of such feed mechanism are disclosed in the aforementioned patent so that no further description thereof is deemed necessary here.

Three gears, one 30 of large diameter, one 32 of intermediate diameter, and one 34 of small diameter, are secured on the drive tube 26 within the gear housing 14 by a key 36. One end of an idler shaft 38, that is disposed in the housing 14 parallel to the drive tube 26, is reduced and journalled, preferably by an anti-friction bearing 40, in a bearing cap 42 secured in the wall 16 of the gear housing. The other end of the shaft 38 also is reduced and extends through and is journalled in, preferably by an anti-friction bearing 44, a bearing sleeve 46 secured in the wall 12 of the gear housing 14. Stacked on the shaft 38 within the housing 14 and in the following order are: a thrust washer 48 that bears against the inner rim of the bearing cap 42, a large gear 50 meshing with the small gear 34, a separator washer 52, a gear 54 of intermediate size meshing with the intermediate gear 32, another separator washer 52, a small gear 56 that meshes with the large gear 30, another separator washer 52, a bevel gear 58 fixed to the shaft 38 by a key 60, and another thrust washer 48 that bears against the inner rim of the bearing sleeve 46. The gears 50, 54 and 56, normally are freely rotatable on the shaft 38. The bevel gear 58 is engaged by a pinion gear 62 fixed, as by a key 64, to the inner end of a driving stub shaft 66 journalled, preferably by an anti-friction bearing 68, in a bearing sleeve 70 fixed in a side wall of the housing 14. The outer end 72 of the stub shaft 66 is square, or of other appropriate configuration, for detachable driven engagement by an appropriate motor (not shown) in order to drive the shaft 38.

Figure 2:
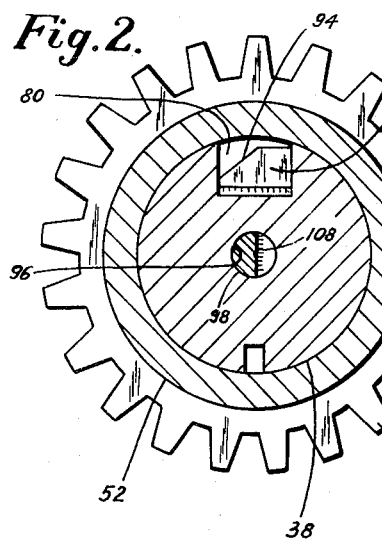
Figure 2 is an enlarged fragmentary sectional view taken substantially on line 2—2 of Figure 1.
Figure 3:
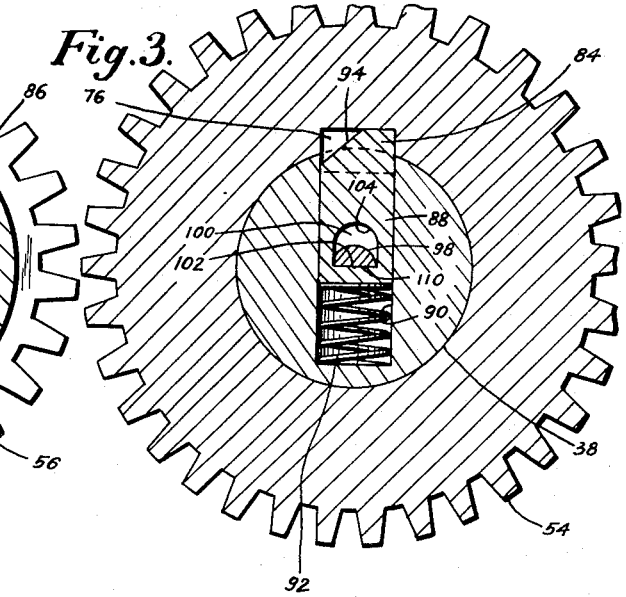
Figure 3 is an enlarged fragmentary sectional view taken substantially on line 3—3 of Figure 1.
Figure 4:
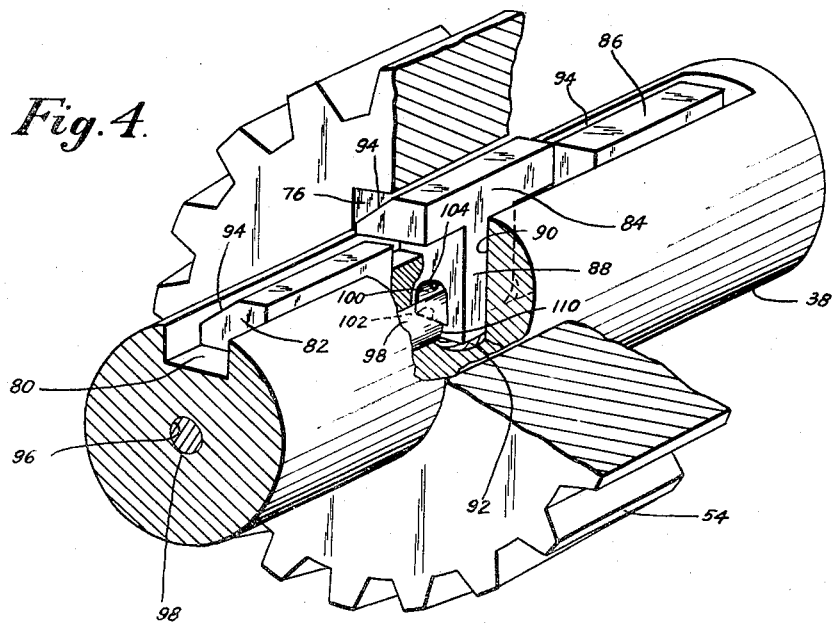
Figure 4 is an enlarged fragmentary perspective view of a portion of the transmission shown in Figure 1, with certain parts being omitted and other parts being broken away in order to better illustrate details.

The hubs of the gears 50, 54, and 56 are provided with interior longitudinal keyways 74, 76, and 78, respectively, while the shaft 38 also is provided with a longitudinal keyway 80. Disposed in the shaft keyway 80 are keys 82, 84, and 86 movable radially outwardly into engagement with the interior of the hubs of the gears 50, 54, and 56, respectively, and further outwardly into engagement with their keyways 74, 76, and 78, respectively. The keys 82, 84, and 86 also are movable radially inwardly completely out of web engagement with the gears 50, 54, and 56, as shown in Figure 2. It will be seen that one of the keys 82, 84, or 86 engages the keyway in the corresponding gear 50, 54, or 56, the latter will be locked to the shaft 38 for rotation therewith so that rotation of the driving stub shaft 66 will rotate the drive tube 26 at a predetermined speed. It obviously follows that when the small gear 56 is locked to the shaft 38 by the key 86, rotation of the stub shaft 66 at a given speed will result in the lowest speed of rotation of the drive tube 26, while locking of the intermediate gear 54 to the shaft 38, as shown in Figures 1, 3, and 4, will result in rotation of the drive tube at an intermediate speed, and locking of the larger gear 50 to the shaft 38 will result in rotation of the drive tube at a higher rate of speed.

Each of the keys 82, 84, and 86 has a stem 88 which extends into a corresponding radial recess 90 in the bottom of the shaft keyway 80. Interposed between the stem 88 of each key 82, 84, and 86 and the bottom of its corresponding recess 90 is a coil compression spring 92 that constantly urges the corresponding key to move outwardly into engagement with the interior of the hub of the corresponding gear 50, 54, or 56. Consequently, when a key 82, 84, or 86, is so engaged and, by reason of rotation of the shaft 38, becomes aligned with the keyway in the corresponding gear, the spring 92 will move the key further outwardly into such keyway and thereby effect locking of such gear to the shaft 38 for rotation therewith. In this connection, each key 82, 84, and 86 is bevelled, as at 94 and as shown in Figures 2, 3, and 4, on the side thereof opposite its driving engagement with its corresponding gear so that in the event of reverse rotation of the drive tube 26 the bevelled edge 94 of a key will engage against an edge of the keyway in the corresponding gear 50, 54, or 56 to thus cam the key back out of engagement within its gear keyway. Consequently, the drive from the stub shaft 66 to the drive tube 26 is one way only, so that any damage to a driving motor cannot occur by possible reverse rotation of the drive tube.

Rotatable and reciprocal in an axial bore 96 in the idler shaft 38 is a shifting rod 98 that projects through a corresponding opening 100 in the stem 88 of each key 82, 84 and 86. One side of each such opening 100 preferably is flat, as at 102, faces outwardly of the corresponding recess 90, and is disposed normal to the direction of radial movement of the key, as shown in Figures 3 and 4. The opposite side of each opening 100 preferably is arcuate, as at 104, to fit closely about the shifting rod 98. The dimension of each opening 100, in the direction of radial movement of its key 82, 84, or 86, is substantially equal to the diameter of the rod 98 and a round side of the latter normally engages the flat side 102 of each opening 100 to retain the corresponding key in its inward gear-unlocking position, as shown by the keys 82 and 86 in Figures 1 and 2.

The rod 98 is provided with two side notches or flats 106 and 108, spaced preferably substantially 180 degrees apart circumferentially of the rod and spaced apart longitudinally along the rod a distance equal to the spacing between the stems 88 of the keys 82 and 86. It will be seen that when the rod 98 is in an axial position to dispose these flats 106 and 108 within the openings 100 in the stems 88 of the keys 82 and 86, the rod can be rotated to dispose one of the notches 106 or 108 in opposition to the corresponding flat side 102 of the opening 100 in the stem 88 of one of the keys 82 or 86. In this position the flat side 102 will move into the notch 106 or 108 and thus release the corresponding key so that its spring 92 will move it outwardly into engagement with the interior of its corresponding gear. At the same time, the other key 86 or 82 will be restrained against such outward movement by the interengagement between the rounded surface of the rod 98 and the flat side 102 of the opening 100 in this other key. It also will be seen that because of the 180-degree angular relationship between the two notches 106 and 108, when one of the keys 82 or 86 is released as aforedescribed, rotation of the rod 98 will serve to first retract such key inwardly out of unlocking engagement with its corresponding gear 50 or 56, and not until such unlocking has been accomplished will the other key 86 or 82 be released to move outwardly against the interior of its gear in order to automatically lock the same to the shaft 38 on projection into the keyway of its gear.

The aforedescribed preferred selective action of the rod 98 to move each key 82 or 86 inwardly and outwardly while maintaining the other key 86 or 82 in its inward position, serves to positively prevent both keys 82 and 86 from engaging with the keyways 74 and 78 of their corresponding gears 50 and 56 at the same time. Such simultaneous engagement would, of course, lock the shaft 38 to the drive tube 26 against any relative rotation therebetween. Such a locking of the shaft 38 to the tube 26 probably would be very destructive and damaging to the parts and gears involved, in the event it occurred while power was being applied to the driving stub shaft 66. It also will be seen that while the parts are proportioned so that the depth of the notches 106 and 108 is equal to half the diameter of the corresponding section of the rod 98 in order to effect the necessary movement of the keys 82 and 86, the proportions could be such as to reduce that depth. In the latter event the spacing between the notches 106 and 108, circumferentially of the rod 98, could be less than 180 degrees, the only requirements being that the notches preferably be circumferentially non-overlapping to an extent sufficient to insure that both gears 50 and 56 cannot be locked to the shaft 38 at the same time.

The shifting rod 38 also is provided with another notch or flat 110 that is disposed between the two flats 106 and 108 and is positionable within the opening 100 in the stem 88 of the key 84, as shown in Figures 1 and 3, when the shifting rod 98 is moved axially to the right from its position wherein the two notches 106 and 108 are within the stems of the keys 82 and 86. The flat or notch 110 preferably is staggered at 90 degrees circumferentially between the two flats 106 and 108, and also is provided with a bevelled side 112 so that when the flat side 102 of the opening 100 through the stem 88 of the key 84 is engaged with the notch 110, axial shifting movement of the rod 98 to the left, from its position shown in Figure 1, will serve to cam the key 84 out of engagement with the gear keyway 76 to thereby unlock the gear 54 for rotation relative to the shaft 38.

The outer end of the rod 98 has a shifting knob or handle 114 secured thereto by a transverse pin 116 which is disposed inwardly of the outer end of the shaft 38 and has one end projecting radially outwardly. The outer end of the shaft 38 is provided with a 180-degree circumferential slot 118 intersected medially by one end of a longitudinal slot 120. The projecting end of the pin 116 rides and is guided within the aforementioned slots 118 and 120. Consequently, as the rod 98 is shifted axially to the left, from the position shown in Figure 1, into a position wherein the two notches or flats 106 and 108 are received within the stems 88 of the two keys 82 and 86, the pin 116 cooperates with the side walls of the slot 120 to prevent rotation of the shifting rod. Hence, when the rod 98 reaches the latter position, all of the keys 82, 84, and 86 are in their inward position out of locking engagement with their corresponding gears, so that the rod then must be rotated in one or the other direction in order to release one of the keys 82 or 86 for outward movement to its gear-locking position. Likewise, when the rod 98 is so rotated between its two rotative positions, the pin 116 engages with the side walls of the circumferential slot 118 to prevent any axial shifting movement of the rod. Because of this construction, it will be seen that only one key 82, 84, or 86 at a time can be in locking engagement with a gear 50, 54, or 56.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:
1. In a variable speed transmission, the combination comprising: a rotatable shaft having a longitudinal bore; a plurality of gears rotatably mounted on said shaft and each having an interior keyway; a keyway in said shaft intersecting said bore; a driving key for each of said gears movable radially in said shaft keyway between an outward position wherein said key will engage within the keyway of the corresponding gear, when aligned radially therewith, to lock said gear to said shaft for rotation therewith, and an inward position wherein said key is disengaged from said gear and the latter is unlocked, each of said keys having therein an opening overlapping the projection of said shaft bore; spring means in said shaft keyway constantly urging each of said keys outwardly; and a shifting rod rotatable in said bore and extending through said key openings, said rod and keys having interengageable cam surfaces effective on rotation of said rod to selectively release one of said keys for movement outwardly to its gear-locking position and then cam said one key back to its inward gear-unlocking position, said cam surfaces being effective to selectively one at a time release and cam back one of said keys while retaining all of the other keys in their inward gear-unlocking position.

2. In a variable speed transmission, the combination comprising: a rotatable shaft having a longitudinal bore; a plurality of gears rotatably mounted on said shaft and each having an interior keyway; a keyway in said shaft intersecting said bore; a driving key for each of said gears movable radially in said shaft keyway between an outward position wherein said key will engage within the keyway of the corresponding gear, when aligned radially therewith, to lock said gear to said shaft for rotation therewith, and an inward position wherein said key is disengaged from said gear and the latter is unlocked, each of said keys having therein an opening overlapping the projection of said shaft bore; spring means in said shaft keyway constantly urging each of said keys outwardly; and a shifting rod rotatable in said bore and extending through said key openings for normally retaining said keys in their inward positions, said rod having therein circumferentially staggered notch means cooperative with edge portions of said openings in said keys and effective on rotation of said rod to selectively release one of said keys for movement to its outward gear-locking position and then cam said one key back to its inward gear-unlocking position, said notch means being disposed in non-overlapping relation circumferentially of said rod, whereby only one key at a time is released and is cammed back before another key is released.

3. In a variable speed transmission, the combination comprising: a rotatable shaft having a longitudinal bore; at least two gears rotatably mounted on said shaft and each having an interior keyway; a keyway in said shaft intersecting said bore; a driving key for each of said gears movable radially in said shaft keyway between an outward position wherein said key will engage within the keyway of the corresponding gear, when aligned radially therewith, to lock said gear to said shaft for rotation therewith, and an inward position wherein said key is disengaged from said gear and the latter is unlocked, each of said keys having therein an opening overlapping the projection of said shaft bore; spring means in said shaft keyway constantly urging each of said keys outwardly; and a shifting rod rotatable in said bore and extending through said key openings, said rod and keys having interengageable cam surfaces effective on rotation of said rod between two positions to first move one of said keys inwardly from its outward gear-locking position to its inward gear-unlocking position while maintaining the other key in an inward gear-unlocking position and then to maintain said one key in its said gear-unlocking position while releasing said other key for outward movement to its gear-locking position.

4. In a variable speed transmission, the combination comprising: a rotatable shaft having a longitudinal bore; at least three gears rotatably mounted on said shaft and each having an interior keyway; a keyway in said shaft intersecting said bore; a driving key for each of said gears movable radially in said shaft keyway between an outward position wherein said key will engage within the keyway of the corresponding gear, when aligned radially therewith, to lock said gear to said shaft for rotation therewith, and an inward position wherein said key is disengaged from said gear and the latter is unlocked, each of said keys having therein an opening overlapping the projection of said shaft bore; spring means in said shaft keyway constantly urging each of said keys outwardly; and a shifting rod rotatable in said bore, shiftable axially therein between two positions, and extending through said key openings for normally retaining said keys in their inward positions, said rod having therein a pair of notches respectively received within said openings in two of said keys in one axial position of said rod and disposed in non-overlapping staggered circumferential relation, said rod having a third notch received within the opening in the third key in the other axial position of said rod, each of said notches being adapted to receive an edge portion adjacent the opening in the corresponding key to release the latter for outward movement to a gear-locking position.

5. The structure defined in claim 4 wherein the third notch is disposed in staggered relation circumferentially midway between the pair of notches.

6. The structure defined in claim 4 wherein one side of the third notch is bevelled for camming engagement with an edge portion of the opening in the third key in order to cam the latter from its outward gear-locking position to its inward gear-unlocking position on axial shifting of the rod from its other to its one axial position.

7. The structure defined in claim 6 including frame means mounting the shaft, and interengageable guide means on said frame means and on said shaft for restraining the latter against rotation in its axial shifting movements and against axial shifting in its rotational movements in its one axial position.

References Cited in the file of this patent

UNITED STATES PATENTS

| | | |
|---|---|---|
| 1,060,024 | Price | Apr. 29, 1913 |
| 1,241,924 | Cole | Oct. 2, 1917 |
| 1,596,192 | Knapp | Aug. 17, 1926 |
| 1,969,436 | Tindell et al. | Aug. 7, 1934 |
| 2,049,103 | Baumgartner | July 28, 1936 |